M. REYNOLDS.
COMBINATION TOOL.
No. 181,104.  Patented Aug. 15, 1876.
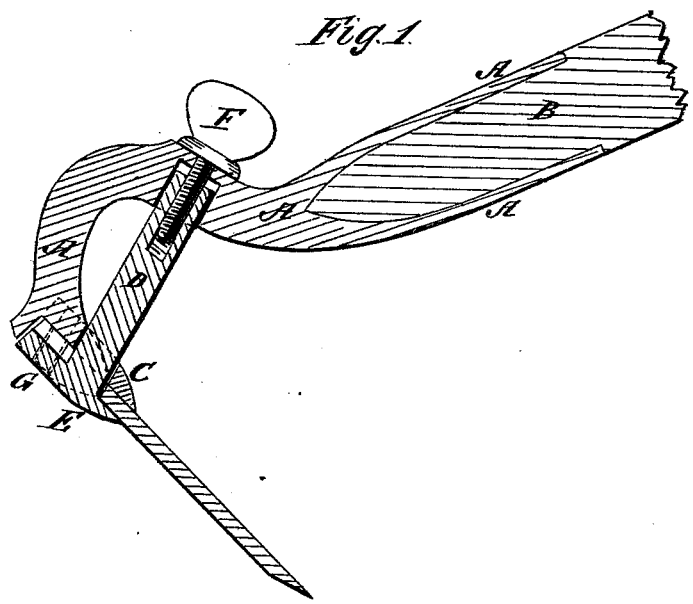
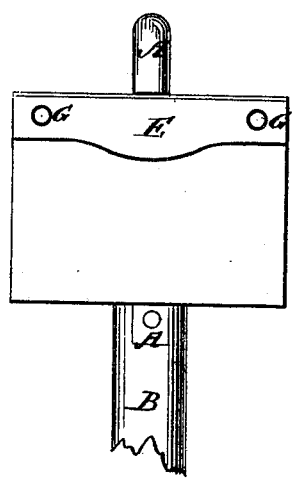
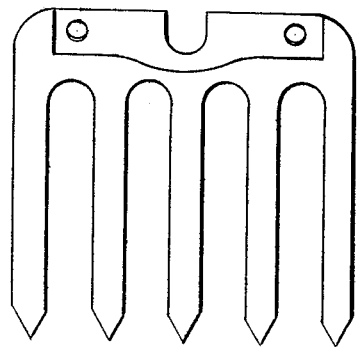
WITNESSES:
E. Wolff
John Goethals
INVENTOR:
M. Reynolds
BY
ATTORNEYS.

UNITED STATES PATENT OFFICE.

MAYNARD REYNOLDS, OF MANCHESTER DEPOT, VERMONT.

IMPROVEMENT IN COMBINATION TOOLS.

Specification forming part of Letters Patent No. 181,104, dated August 15, 1876; application filed June 6, 1876.

*To all whom it may concern:*

Be it known that I, MAYNARD REYNOLDS, of Manchester Depot, Bennington county, Vermont, have invented a new and Improved Combination Tool, of which the following is a specification:

Figure 1 is a detail section of my improved tool, arranged as a hoe. Fig. 2 is a front view of the same; and Fig. 3 is a detail view of the potato-hook.

Similar letters of reference indicate corresponding parts.

The object of this invention is to furnish an improved shank, which shall be so constructed as to receive and securely hold a hoe, a weeding-hoe, a potato-hook, and a rake in such a way that the said tools may be attached and detached by simply tightening and loosening a screw.

The invention consists in the shank provided with the two plates, the arm, the hand-screw, and the pins, to adapt it to receive and hold a hoe, a potato-hook, or a rake, as hereinafter fully described.

A represents the shank, in the socket of which a handle, B, is secured in the usual way. Upon the forward end of the shank A is formed a plate, C, having a hole formed through it to receive the arm D formed upon the plate E, which is made similar to the plate C in shape and size. The end of the arm D enters a recess in the under side of the neck of the shank A, and has a screw-hole formed in its end to receive a hand-screw, F, that passes in through the said shank A, as shown in Fig. 1. Upon the plate C are formed two pins, G, to enter holes in the plate E to prevent the tool from turning when used upon one corner, and to take a part of the strain off the arm D.

A hoe, a narrow or weeding hoe, a potato-hook, and a rake are designed to be made and sold with the shank and handle, all of which tools have the middle part of their heads made of such a thickness that they may be placed between the plates C E with a notch in their upper edges to receive the arm D, and with holes in their end parts to receive the pins G.

By this construction by simply loosening the hand-screw F either of the tools can be detached, and another inserted in its place, so that the farmer or gardener need buy but one handle or shank for his set of tools, and can easily apply either of said tools to his shank, as may be needed.

Having thus described my invention, I claim as new and desire to secure by Letters Patent—

The combination, with shank A, of the apertured plate C, the arm D passing through plate C and shank A, the plate E, and the screw F, all constructed and arranged substantially as and for the purpose described.

MAYNARD REYNOLDS.

Witnesses:
EBER L. TAYLOR,
D. R. SWALLOW.